United States Patent [19]

Stone

[11] Patent Number: 5,660,038

[45] Date of Patent: Aug. 26, 1997

[54] ROTARY JET ENGINE

[76] Inventor: Joseph Walter Stone, Ivanhoe Farm, Wamenusking East Road, Quairading, Western Australia, Australia

[21] Appl. No.: 256,714

[22] PCT Filed: Jan. 21, 1993

[86] PCT No.: PCT/AU93/00029

§ 371 Date: Feb. 13, 1995

§ 102(e) Date: Feb. 13, 1995

[87] PCT Pub. No.: WO93/15312

PCT Pub. Date: Aug. 5, 1993

[30] Foreign Application Priority Data

Jan. 24, 1992 [AU] Australia ..................... PL0568

[51] Int. Cl.⁶ .................................................. F02K 7/10
[52] U.S. Cl. .................................................. 60/39.35
[58] Field of Search ............................ 60/39.35, 39.34, 60/39.75, 271; 416/20 R, 21

[56] References Cited

U.S. PATENT DOCUMENTS

| | | | |
|---|---|---|---|
| 1,003,708 | 9/1911 | Coleman | 60/39.35 |
| 2,486,990 | 11/1949 | Sharpe | 60/39.34 |
| 3,005,311 | 10/1961 | Ross | 60/39.75 |
| 4,706,452 | 11/1987 | Lavoie . | |
| 5,408,824 | 4/1995 | Schlote | 60/39.35 |

FOREIGN PATENT DOCUMENTS

| | | | |
|---|---|---|---|
| 1260402 | 9/1989 | Canada | 60/39.35 |
| 2308128 | 10/1974 | Germany | 60/39.35 |
| 2240817 | 8/1991 | United Kingdom . | |

OTHER PUBLICATIONS

European Search Report dated Jul. 27, 1995. Further Official Action dated Sep. 4, 1995.

*Primary Examiner*—Timothy S. Thorpe
*Attorney, Agent, or Firm*—Knobbe, Martens, Olson & Bear LLP

[57] ABSTRACT

A rotary jet engine including a housing having intake and exhaust zones separated from each other. At least one combustion jet is mounted on a rotor having an intake spaced from the axis of rotation for effecting ram air delivery of air from the intake zone. Exhaust from the combustion jet causes rotation of the rotor while the intake and exhaust separator inhibits flow from said exhaust zone to said intake zone.

20 Claims, 9 Drawing Sheets

ROTARY JET ENGINE

This application is a 371 continuation of PCT/AU93/00029, filed Jan. 21, 1993.

TECHNICAL FIELD

THIS INVENTION relates to a rotary engine which uses a fluid jet for power generation (hereinafter be referred to as a "rotary jet engine").

BACKGROUND OF THE INVENTION

With engines which utilise an expanding fluid to drive an output shaft, it is common to have a working chamber which varies in volume upon expansion of the fluid. The working chamber is usually defined between wall surfaces, at least one of which is movable relative to the other wall surfaces to facilitate transmission of the power generated by the expanding fluid to an output shaft. The need for wall surfaces movable relative to each other introduces problems, one being associated with sealing between such surfaces and another being frictional losses.

The present invention seeks to provide a rotary engine which does not utilise a working chamber of variable volume. In this way the invention seeks to limit sealing problems and frictional losses which are common with conventional rotary engines and internal combustion engines generally.

SUMMARY OF THE INVENTION

In one form the invention resides in a rotary jet engine comprising a housing having intake and exhaust zones separated from each other, a rotor mounted for rotation within the housing, at least one jet means for generating propulsive fluid from air, the jet means having an intake for receiving air and an exhaust outlet for ejection of the propulsive fluid, the jet means being mounted on the rotor whereby the thrust force thereof causes rotation of the rotor, the inlet of the jet means communicating with the intake zone and the outlet of the jet means communicating with the exhaust zone, and means for inhibiting fluid flow from the exhaust zone to the intake zone.

The intake and exhaust zones within the housing are preferably separated from each other by the rotor.

The means for inhibiting fluid flow may comprise a sealing means provided between the housing and the rotor. Alternatively or additionally, the means for inhibiting fluid flow may comprise means for generating a positive pressure in the intake zone as compared to the exhaust zone. The means for generating a positive pressure in the intake zone may comprise a delivery means for deliverying air into the intake zone.

There may be a plurality of the jet means, at least one of which is mounted on the rotor and at least another of which is mounted on a stationary part of the engine. In still another arrangement there may be two contra-rotating rotors one of which has at least one jet means. Such jet means is arranged to drive the rotor on which it is mounted by its thrust force and to drive the contra-rotating rotor by impingement of the propulsive fluid thereon. In still another arrangement there may be two contra-rotating rotors each having at least one jet means mounted thereon. Each jet means is arranged to drive the rotor on which it is mounted by its thrust force and to drive the contra-rotating rotor by impingement of the propulsive fluid thereon.

It is particularly convenient for the propulsive fluid to be heated atmospheric air, the heating being accomplished by any suitable means.

With this arrangement, the jet means preferably comprises a jet burner, which may be of conventional form. In such a case, the atmospheric air is heated in the jet burner by burning a fuel within the air. The fuel may be a liquid hydrocarbon fuel such as power kerosene.

It should be appreciated, however, that any other suitable means may be employed for heating the air, such as by some form of nuclear process.

Preferably, the rotor is mounted on an output shaft.

The rotor may comprise a rotor disc. The intake of the jet means may open onto one side of the rotor disc and the exhaust outlet may open onto the other side of the rotor disc.

There may be one or more of the rotors. Where there is more than one rotor, the rotors may rotate in the same direction or in opposite directions. In the latter case, the rotor which rotates in the opposite direction to the output shaft may be drivingly connected thereto in any suitable way such as by gearing.

Preferably, the rotary jet engine further comprises a reaction means against which propulsive fluid discharging from the jet means is directed to enhance the thrust force of the jet means. The reaction means may comprise a plurality of circumferentially spaced reaction surfaces such as vanes.

The housing is preferably has a generally cylindrical side wall disposed substantially co-axially with the axis of rotation of the rotor. The housing may include an intake zone and an exhaust zone, the intake of the jet means communicating with the intake zone and the outlet of the jet means communicating with the exhaust zone.

There may be a multitude of jet burners. The jet burners may be arranged in pairs with the jet burners of each pair disposed on diametrally opposed sides of the axis of rotation of the rotor.

BRIEF DESCRIPTION OF THE DRAWINGS

The invention will be better understood by reference to the following description of several specific embodiments thereof as shown in the accompanying drawings.

MODES OF CARRYING OUT INVENTION

Figure 1:
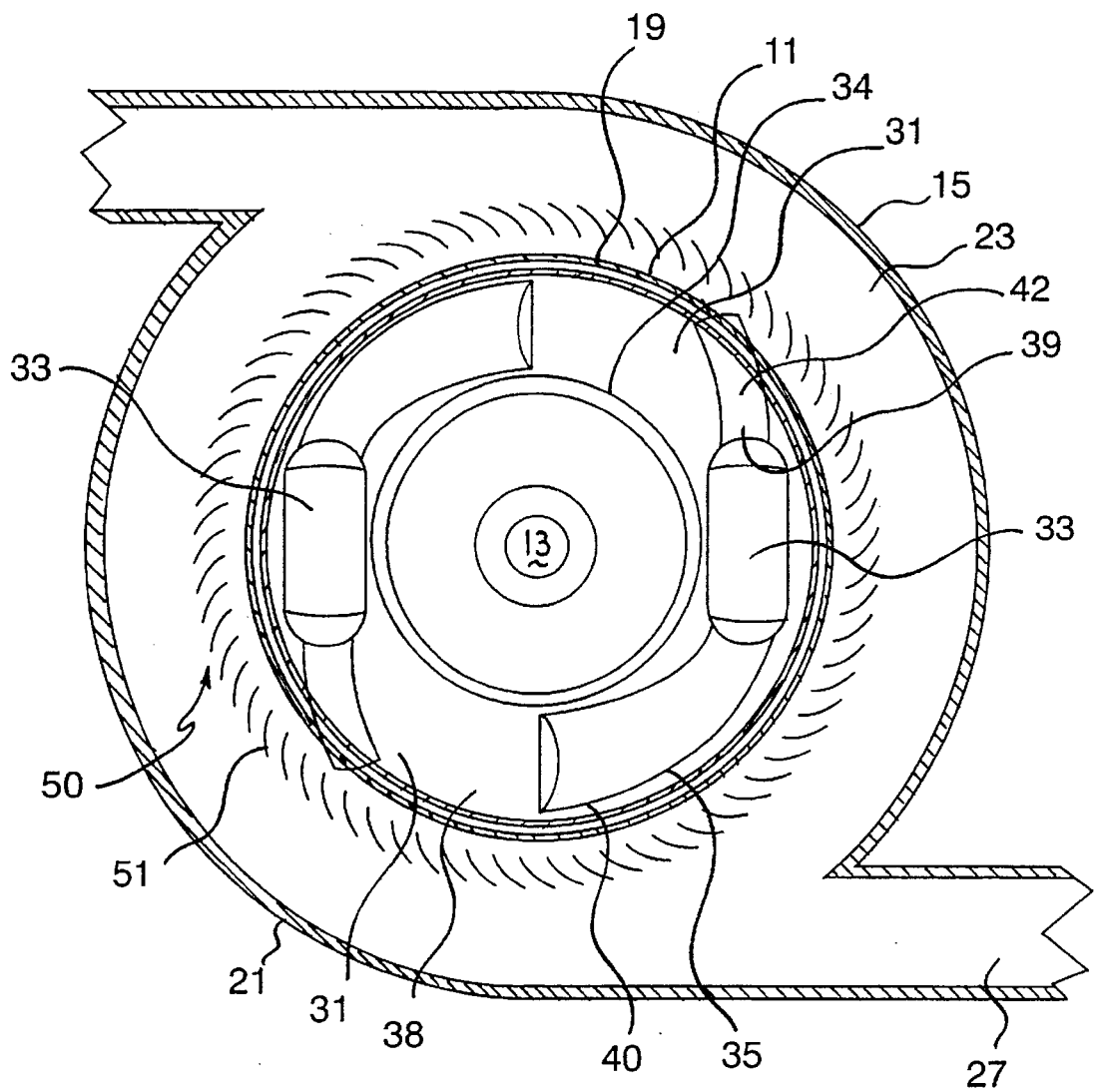
FIG. 1 is a schematic end view of a rotary jet engine according to the first embodiment.
Figure 2:
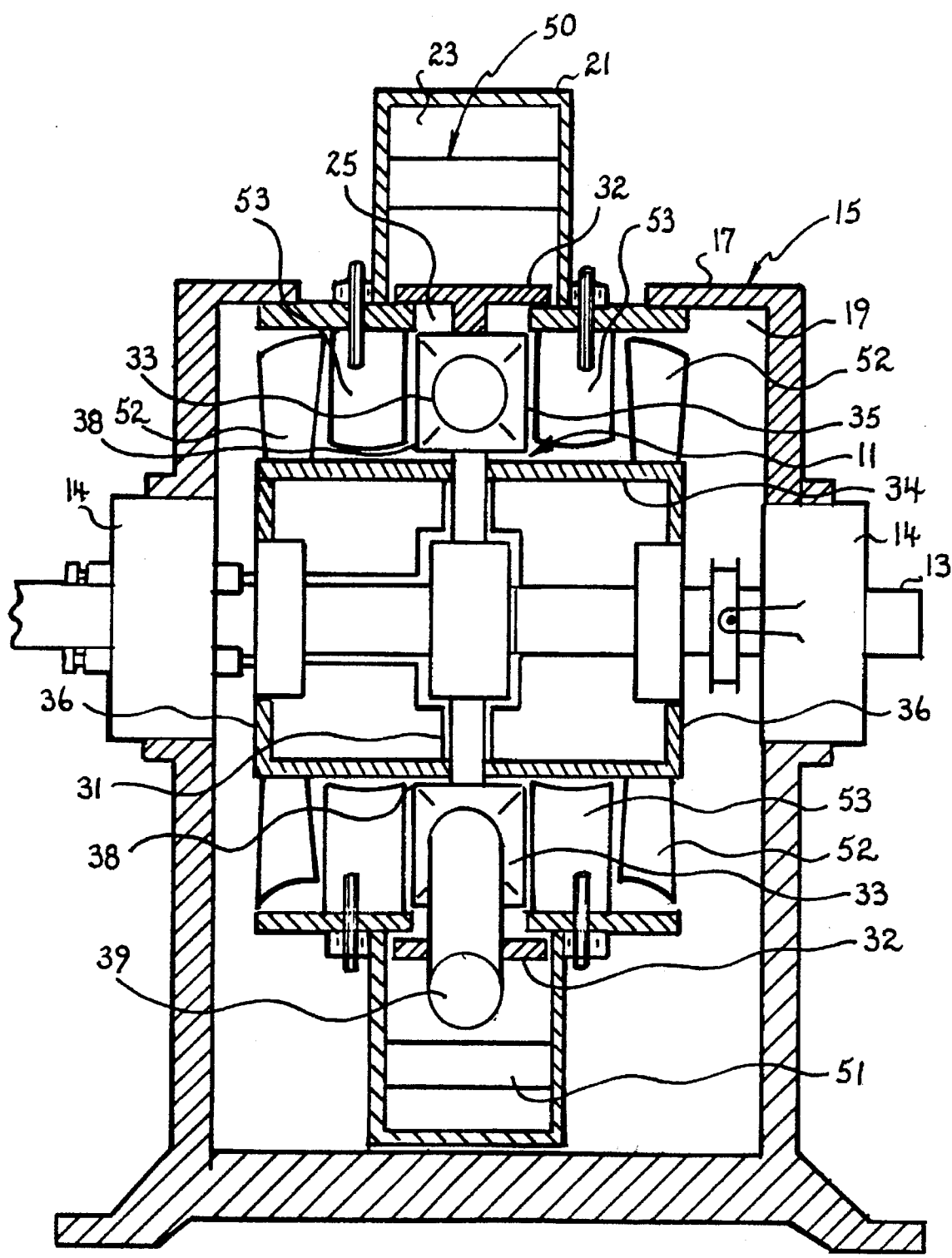
FIG. 2 is a schematic side view of the engine of FIG. 1.
Figure 3:
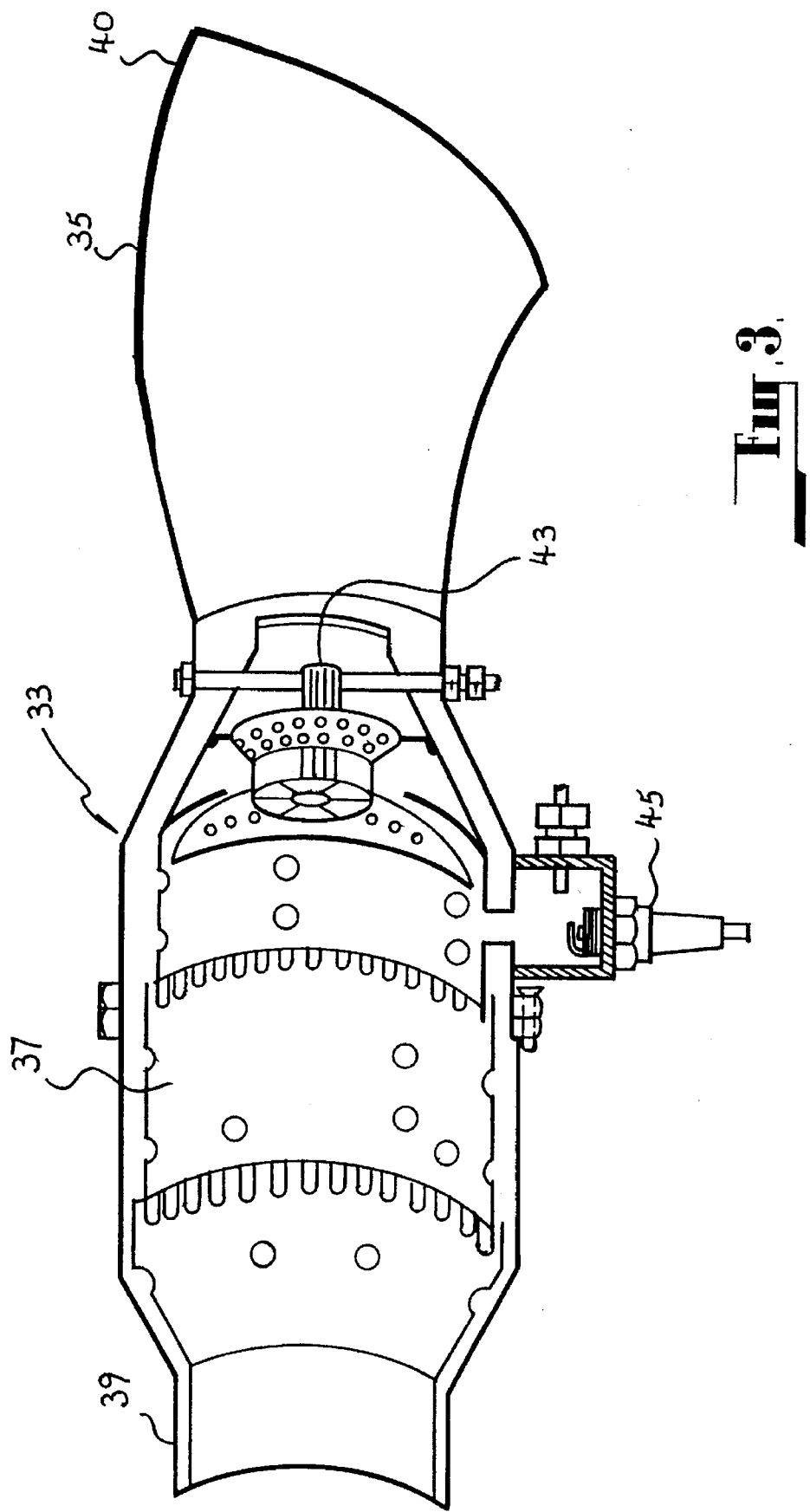
FIG. 3 is a schematic view of a jet burner utilised in the rotary jet engine of the first embodiment.

The rotary jet engine according to the first embodiment is shown in FIGS. 1, 2 and 3 and comprises a rotor 11 rigidly mounted onto an output shaft 13 rotatably supported on bearings 14. The rotor 1t is accommodated within a housing 15 having a cylindrical side wall 17 which is co-axial with the axis of rotation of the shaft 13 and which defines an inner region 19. The cylindrical side wall 17 incorporates a manifold 21 which defines an annular outer region 23 which is concentric with the shaft and which communicates with the inner region 19 by way of an annular gap 25. A tangential exhaust duct 27 communicates with the manifold 21.

The output shaft 13 extends beyond both ends of the housing 15, as best seen in FIG. 2 of the drawings.

The rotor 11 comprises a disc 31 which is rigidly mounted at its radially inner end onto the output shaft 13 and which carries a pair of jet burners 33. The two burners 33 are positioned on diametrally opposed sides of the output shaft, as can be best seen in FIG. 1 of the drawings. The disc 31 extends through the annular gap 25 in the side wall 17 of the housing 15 and carries a rigid sealing element 32 at its outer end. The rigid sealing element is disposed in very close proximity to, but is spaced from, the portion of the side wall 17 defining the gap 25 so as to restrict fluid flow through the gap.

The rotor 11 further comprises a cylindrical rotor wall 34 co-axially and rigidly mounted on the output shaft 13 for rotation therewith. The cylindrical rotor wall 34 is, more particularly, mounted on the rotor disc 31 and on two support elements 36 positioned on the output shaft 13 one to each side of the rotor disc 31.

The cylindrical rotor wall 34 is spaced inwardly of the cylindrical side wall 17 of the housing 15. The two walls 17, 34 co-operate to define an air chamber 38 therebetween which receives atmospheric air, as will be explained later.

Each jet burner 33 is of conventional form, comprising an inlet 35, a combustion chamber 37, and an exhaust nozzle 39, as best seen in FIG. 3 of the drawings. The inlet 35 incorporates at intake funnel 40 and the exhaust nozzle 39 is fitted with an extension duct 42. Each of the jet burners is so arranged on the disc 31 that the inlet communicates with the air chamber 38, which constitutes an intake zone, and the extension duct 42 extends through the annular gap 25 such that the outlet end thereof communicates with the outer region 23 within manifold 21, which constitutes an exhaust zone.

The jet burner receives atmospheric air within the air chamber 38 through the inlet 35 and heats the air to generate a propulsive fluid by combustion of a hydrocarbon fuel. The fuel is injected into the burner by way of a fuel injector 43 and combustion is initiated by an ignition device 45. As a result of the combustion process, the air is heated and so expands with the result that it is ejected in the form of a jet through the outlet nozzle 39 into the region within the manifold 21. Air ejecting from the burner generates propulsive thrust which causes the rotor to rotate and so transmits torque to the output shaft 13.

Reaction means 50, which comprise a plurality of reaction surfaces in the form of circumferentially spaced vanes 51, are provided within the manifold 21. The propulsive fluid jetting from each nozzle 39 impinges on the vanes 51, so enhancing the propulsive thrust generated by the propulsive fluid. The vanes 51 also serve to direct the propulsive fluid in a uniform manner in a direction away from the rotor, so creating a flow pattern which leads to the tangential exhaust duct.

As previously mentioned, the jet burners 33 each take in air from the air chamber 38 within the housing 15. The propulsive efficiency of, and/or the thrust generated by, each jet burner can be increased by increasing the mass flow rate of air into the burner through the inlet 35 thereof. The mass flow rate of air into the burner can be increased by raising the pressure of air within the air chamber 38. This is accomplished in this embodiment by providing two blade assemblies 52 on the rotor 11, one to each side of the rotor disc 31. The blade assemblies 52 rotate with the output shaft and blow air into the air chamber 38, thereby increasing air pressure within the chamber. A series of stationary guide vanes 53 are positioned between each blade assembly 52 and the jet burners to direct the air uniformly towards the axially central region of the rotor and into the path of the intake funnels of the inlets 35 of the jet burners.

The air delivered into the air chamber 38 to the axially central region of the rotor by the two blade assemblies 52 may come directly from atmosphere or through an air delivery system which incorporates a filter arrangement.

The separation which exists between the air chamber 38 and the region defined within the manifold 21 is beneficial in that it avoids, or at least, limits contamination of the intake air by the propulsion fluid exhausted from the jet burners. This is also assisted by the positive air pressure which develops in the air chamber 38 by the action of the blade assemblies 52 during operation of the engine.

Figure 4:
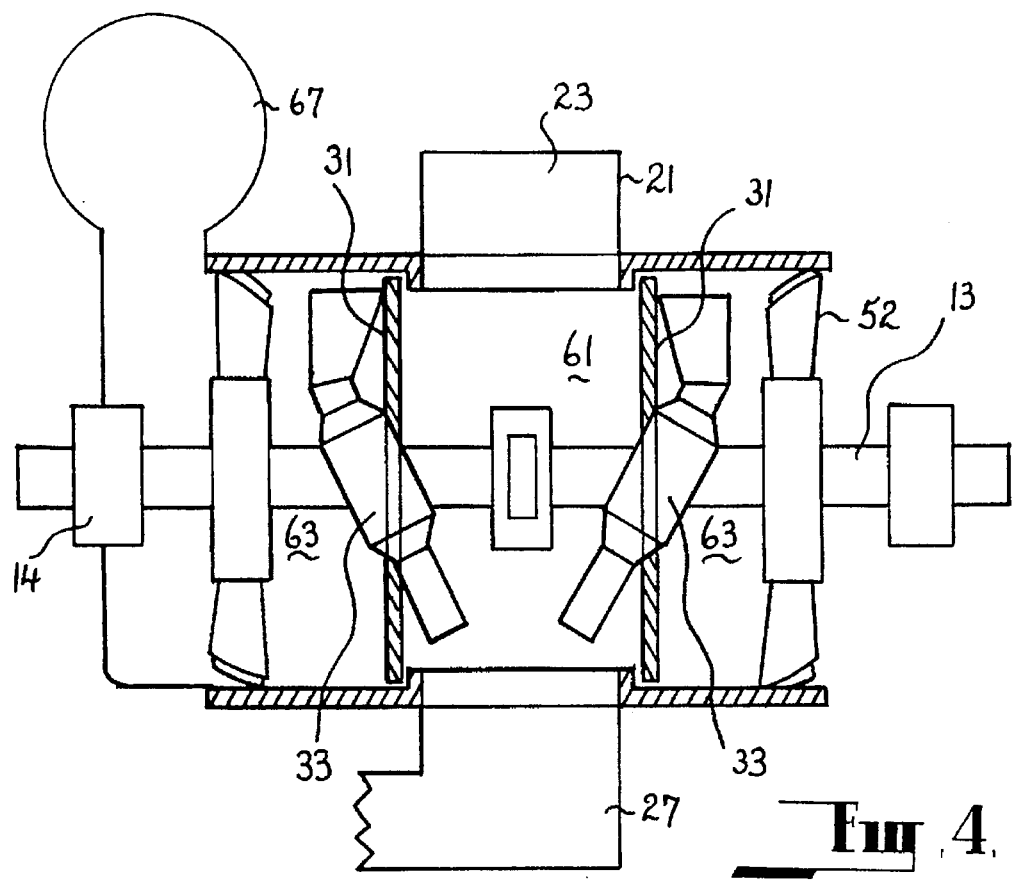
FIG. 4 is a schematic view of a rotary jet engine according to a second embodiment.

The second embodiment, which is shown in FIG. 4 of the drawings, is similar in many respects to the first embodiment but each jet burner 33 is mounted on a separate rotor disc 31. Additionally, the jet burners are oriented so that the inlet 35 thereof is disposed to one side of the respective disc and the exhaust nozzle 39 thereof is disposed on to the other side of the disc. This arrangement is particularly useful as it assists in maintaining separation between the intake air and the propulsive fluid, thus avoiding or at least limiting contamination of the intake air by the propulsive fluid. The two rotor discs 31 serve to divide the inner region 19 into three sections being a central section 61 and a pair of end sections 63. The exhaust nozzles 39 of the burners communicate with the central section 61 and the inlets 35 of the nozzles each communicate with a respective one of the end sections 63. The rotor discs 31 co-operate with the housing to provide a seal, or at least a flow restriction, between the neighbouring sections 61 and 63.

In this embodiment, each blade assembly 52 delivers air under pressure to a respective one of the end sections 63 of the housing. While only shown on one side of the engine illustrated in FIG. 4, each blade assembly receives air from an air delivery system 65 which incorporates an air filtering means 67.

Figure 5:
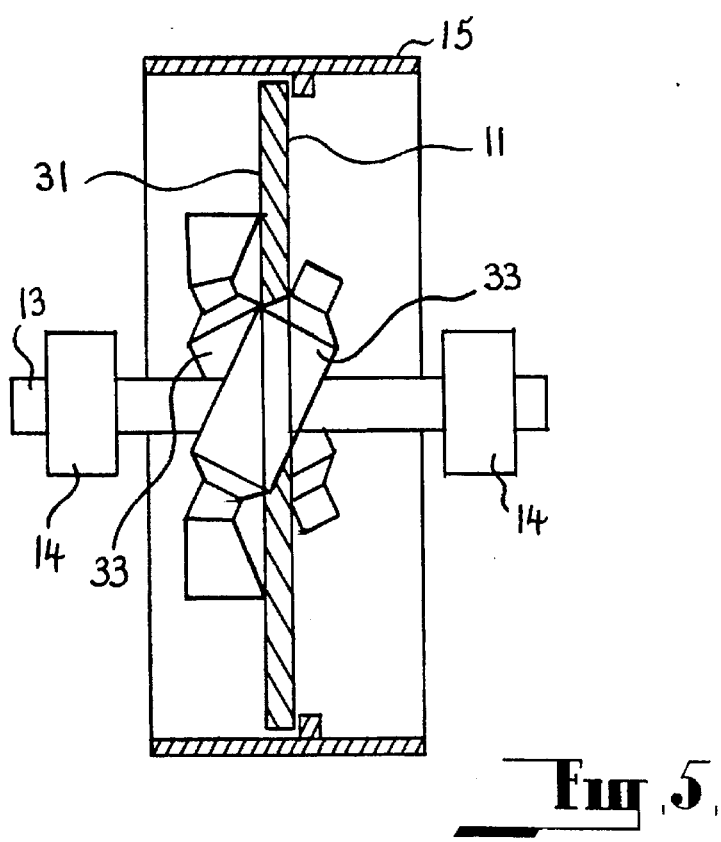
FIG. 5 is a schematic side view of a rotary jet engine according to a third embodiment.

The embodiment shown in FIG. 5 of the drawings is a simpler form of engine in comparison to the previous embodiments. The jet burners 33 are mounted on a central disc 31 and each receives air directly from atmosphere. There are no blade assemblies or other delivery means for delivering air under pressure into the region which accommodates the rotor. As with the embodiment shown in FIG. 4 of the drawings, the burners are disposed angularly so that the inlet 35 and exhaust nozzles 39 are on opposed side of the disc.

Figure 6:
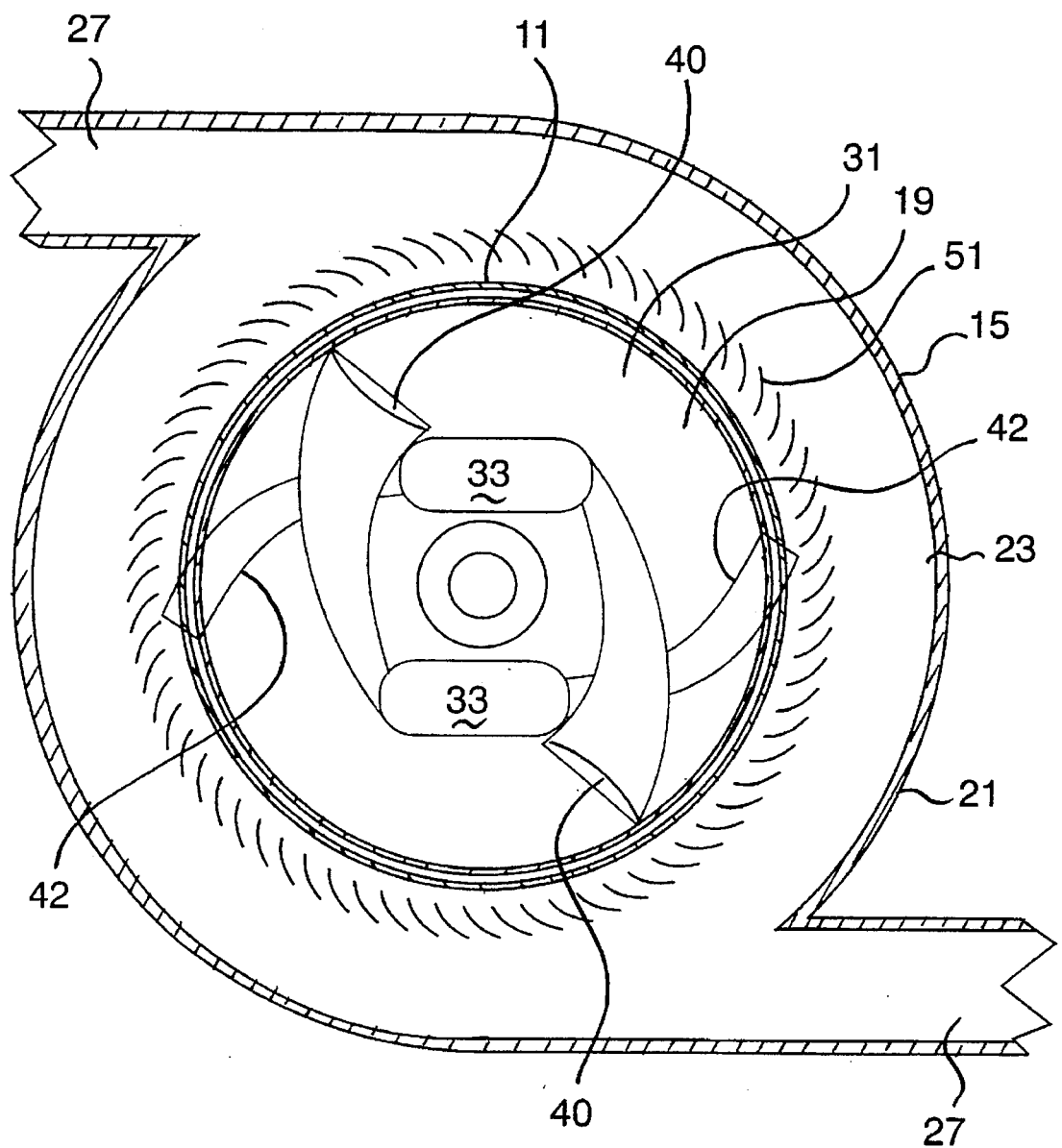
FIG. 6 is a schematic end view of a rotary jet engine according to a fourth embodiment.

The embodiment shown in FIG. 6 of the drawings is somewhat similar to the previous embodiments, with the exception that the jet burners 33 are positioned relatively closely to the output shaft 13. This has a benefit in that it reduces the moment of inertia of the rotor and provides for easier balancing of the rotor. Each inlet 35 has an elongated intake funnel 40 which extends to the periphery of the rotor and each exhaust nozzle also has an elongated extension duct 42 which extends beyond the disc to direct the propulsive fluid onto the reaction vanes 51.

Figure 7:
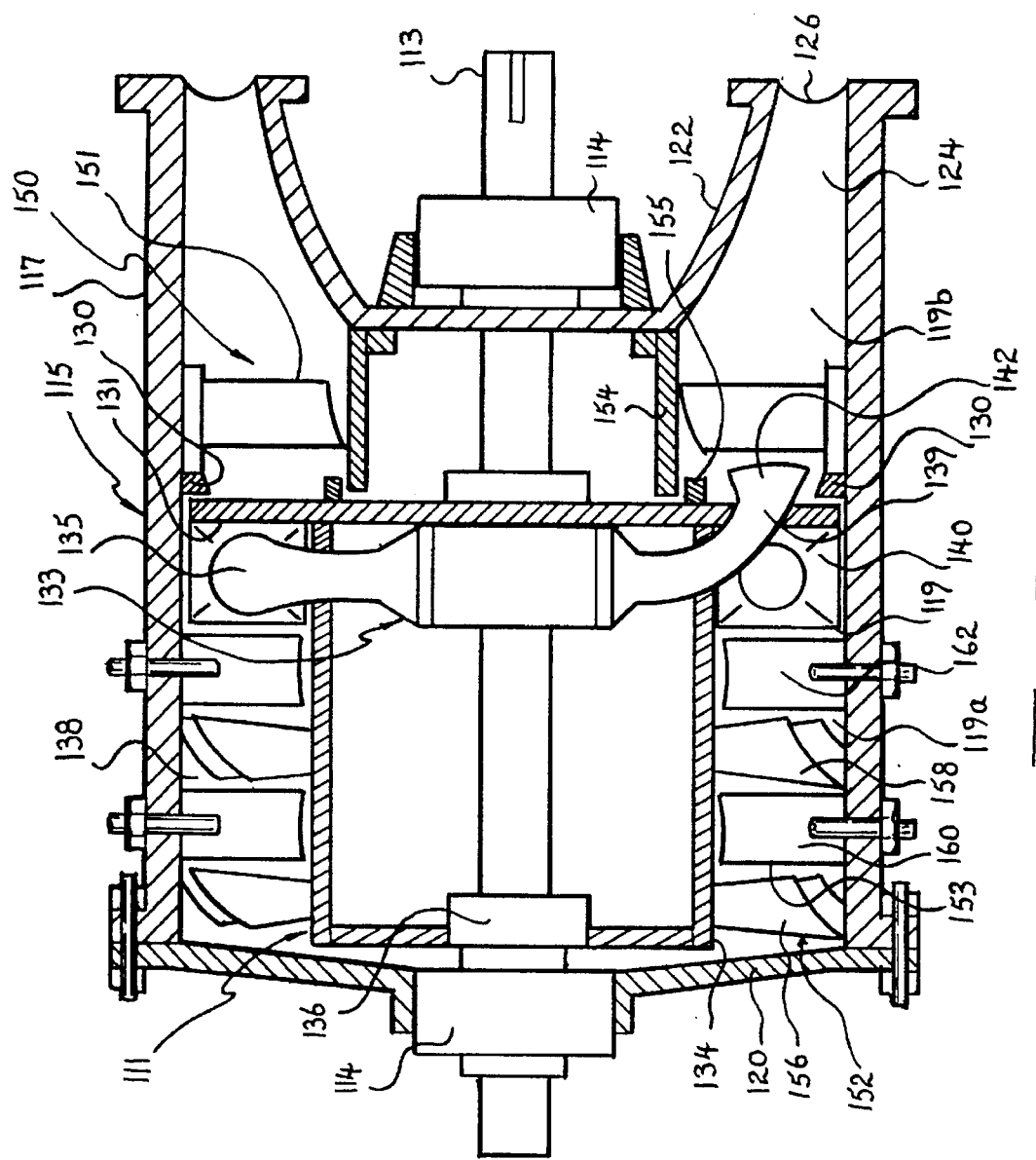
FIG. 7 is a schematic end view of a rotary jet engine according to a fifth embodiment.
Figure 8:
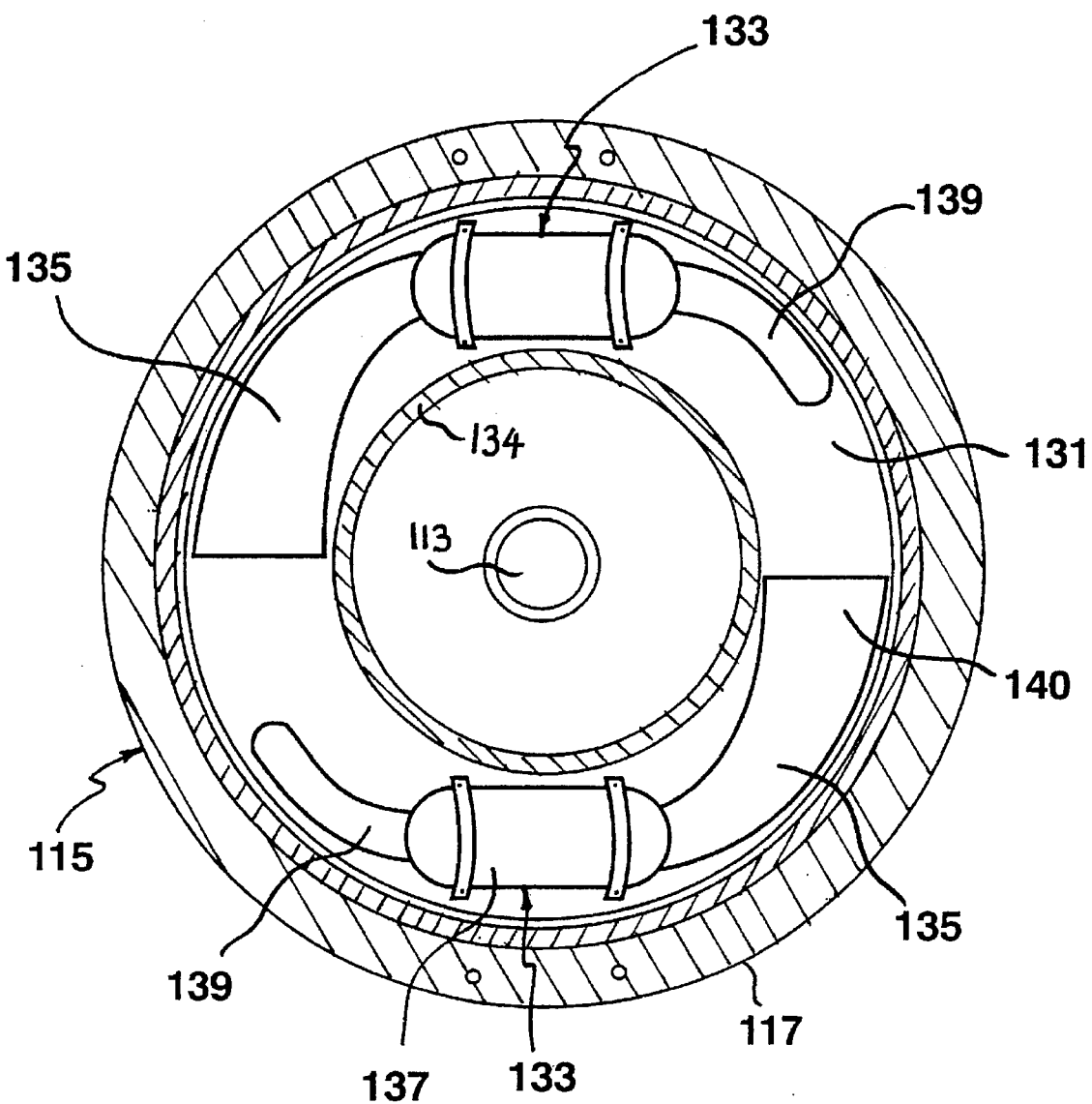
FIG. 8 is a schematic view from one side of the rotor of the engine of FIG. 7.
Figure 9:
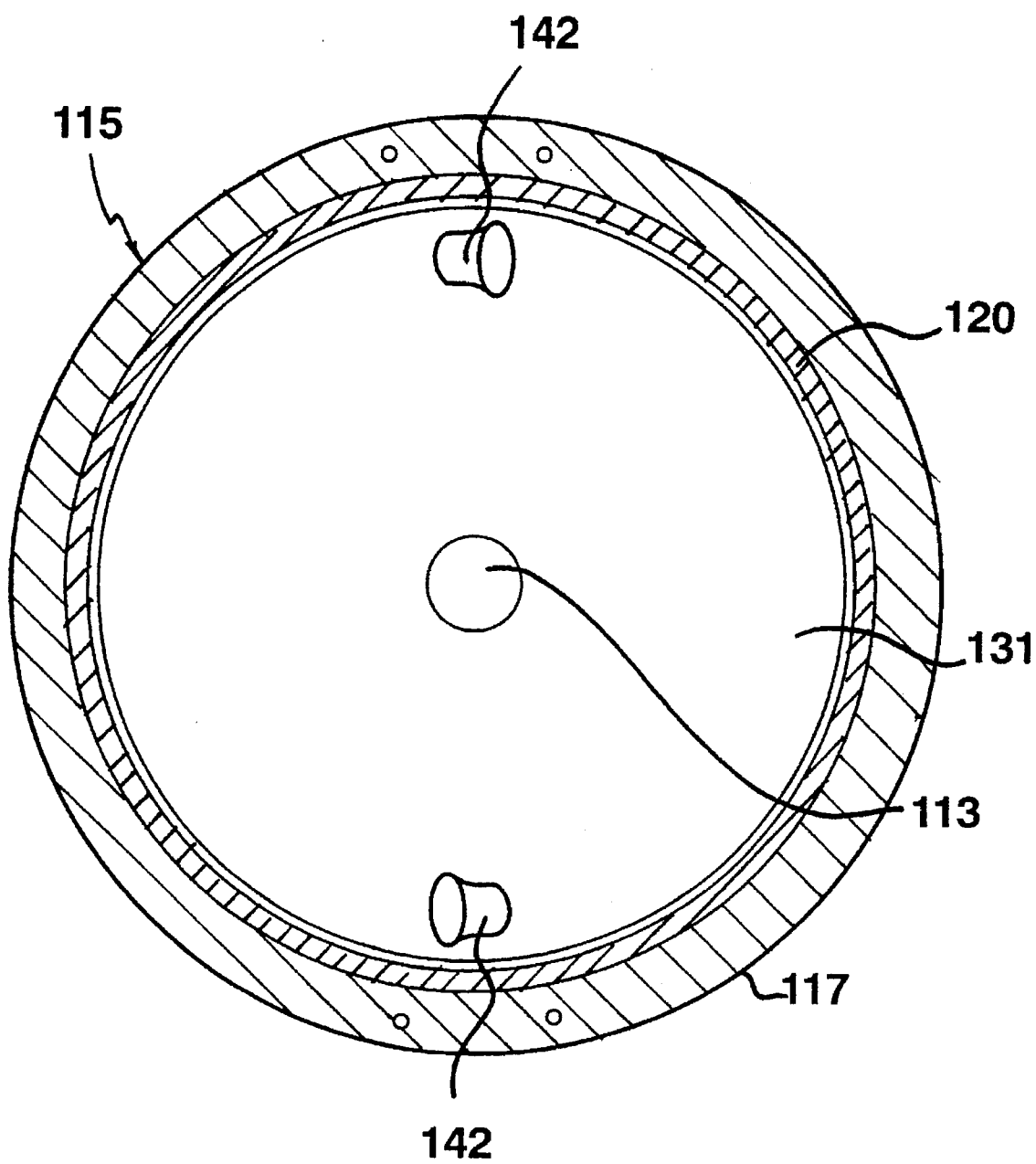
FIG. 9 is a schematic view from the other side of the rotor shown in FIG. 8.

A rotary jet engine according to a further embodiment is shown in FIGS. 7, 8 and 9. This engine is more compact in terms of its radial dimension than the engines of the earlier embodiments having an annular exhaust manifold. Because of its compact nature, this engine lends itself to application in the automotive field. The engine comprises a rotor 111 rigidly mounted onto an output shaft 113 rotatably supported on bearings 114. The rotor 111 is accommodated within a housing 115 having a cylindrical side wall 117 which is co-axial with the axis of rotation of the shaft 113 and which defines an inner region 119. The housing 115 has a first end wall 120 and a second end wall 122 at-opposite ends of the inner region 119. The first end wall 120 incorporates an air inlet (not shown) and the second wall 122 co,operates with the cylindrical side wall 117 to define an exhaust outlet duct 124 which terminates at an annular outlet opening 126.

The output shaft 113 extends beyond both ends of the housing 115, as best seen in FIG. 7 of the drawings.

The rotor 111 comprises a disc 131 which is rigidly mounted at its radially inner end onto the output shaft 113 and which carries a pair of jet burners 133. The two burners 133 are positioned on diametrally opposed sides of the output shaft.

The rotor disc divides the inner region 119 into two zones being an intake zone 119a which communicates with the inlet in end wall 120 and an exhaust zone 119b which communicates with the exhaust outlet duct 124.

An annular sealing element 130 is provided on the cylindrical side wall 117 in very close proximity to, but spaced apart from, the radially outer portion of the rotor disc 131. The rotor 131 and the and the sealing element 130 co-operate to restrict fluid flow between the two zones 119a and 119b.

The rotor 111 further comprises a cylindrical rotor wall 134 which is located in intake zone 119a and which is co-axially and rigidly mounted on the output shaft 113 for rotation therewith. The cylindrical rotor wall 134 is, more particularly,, mounted on the rotor disc 131 and on a support element 136 positioned on the output shaft 113 to the side of the rotor disc 131 which confronts end wall 120.

The cylindrical rotor wall 134 is spaced inwardly of the cylindrical side wall 117 of the housing 115. The two walls 117, 134 co-operate to define an air chamber 138 therebetween which receives atmospheric air through the inlet (not shown) in end wall 120.

Each jet burner 133 is of conventional form, comprising an inlet 135, a combustion chamber 137, and an exhaust nozzle 139. The inlet 135 incorporates an intake funnel 140 and the exhaust nozzle 139 is fitted with an extension duct 142. Each of the jet burners is so arranged on the disc 131 that the inlet 135 communicates with the air chamber 138 in the intake section 119a and the extension duct 142 communicates with the exhaust section 119b.

Reaction means 150, which comprise a plurality 0f reaction surfaces in the form of circumferentially spaced vanes 151, are provided in the exhaust section 119b. The propulsive fluid jetting from each nozzle 139 impinges on the vanes 151, so enhancing the propulsive thrust generated by the propulsive fluid. The vanes 151 also serve to direct the propulsive fluid in a uniform manner in a direction away from the rotor, so creating a flow pattern which leads towards the exhaust outlet duct 124.

The vanes 151 are mounted on the cylindrical side wall 117 and extend radially inwardly towards a cylindrical fairing 154 which assists in containing the propulsive fluid and directing it towards the exhaust outlet duct 124. The fairing 154 is rigidly mounted on the second end wall 122 of the housing 115 and extends across the exhaust zone 119b towards the rotor disc 113. A further sealing element 155 mounted on the rotor disc 113 co-operates with the fairing 154 to limit fluid flow between the rotor disc and the fairing.

The jet burners 133 each take in air from the air chamber 138 within the housing 115. Air entering the air chamber 138 through the inlet in the end wall 120 is conveyed to the burners by way of blade assemblies 152 and co-operating guide vanes 153. The blade assemblies comprise are in two stages, comprising a first stage 156 and a second stage 158. The two stages progressively increase the pressure of air as it is conveyed through the air chamber 138 to the gas burners. The guide vanes 153 are mounted on the housing 115 and are also in two stages, comprising a first stage 160 located between the two stages of the blade assemblies and a second stage 162 located between the second stage of the blade assemblies and the rotor disc 131.

In a further embodiment (which is not illustrated in the drawings), the rotary jet engine has contra-rotating rotors, each drivingly coupled to a common output shaft. A benefit of this arrangement is that the contra-rotation can eliminate, or at least minimise, gyroscopic effects. Each rotor has at least one jet burner and an associated reactionary means such as vanes. With this arrangement, the jet burner on each rotor can propel both of the rotors. The rotor which carries each jet burner is propelled by virtue of the propulsive thrust generated by the jet burner. The jet burner is also arranged to direct the propulsive fluid expelled from it onto the reactionary means of the other rotor. This propulsive fluid impinging on the other rotor causes it to rotate.

In a still further embodiment (which is also not shown), the jet burners are mounted on a stationary part of the engine and are so arranged that the propulsive fluid ejected by the jet burners impinges upon the rotor thereby causing it to rotate. The rotor is provided with reactionary surfaces such as vanes against which the propulsive fluid can impinge to produce the rotation.

While rotary jet engines according to the various embodiments have been described as operating on liquid hydrocarbon fuel, it will be appreciated that any suitable form of fuel can be employed for heating of air to generate the propulsive fluid.

Figure 10:
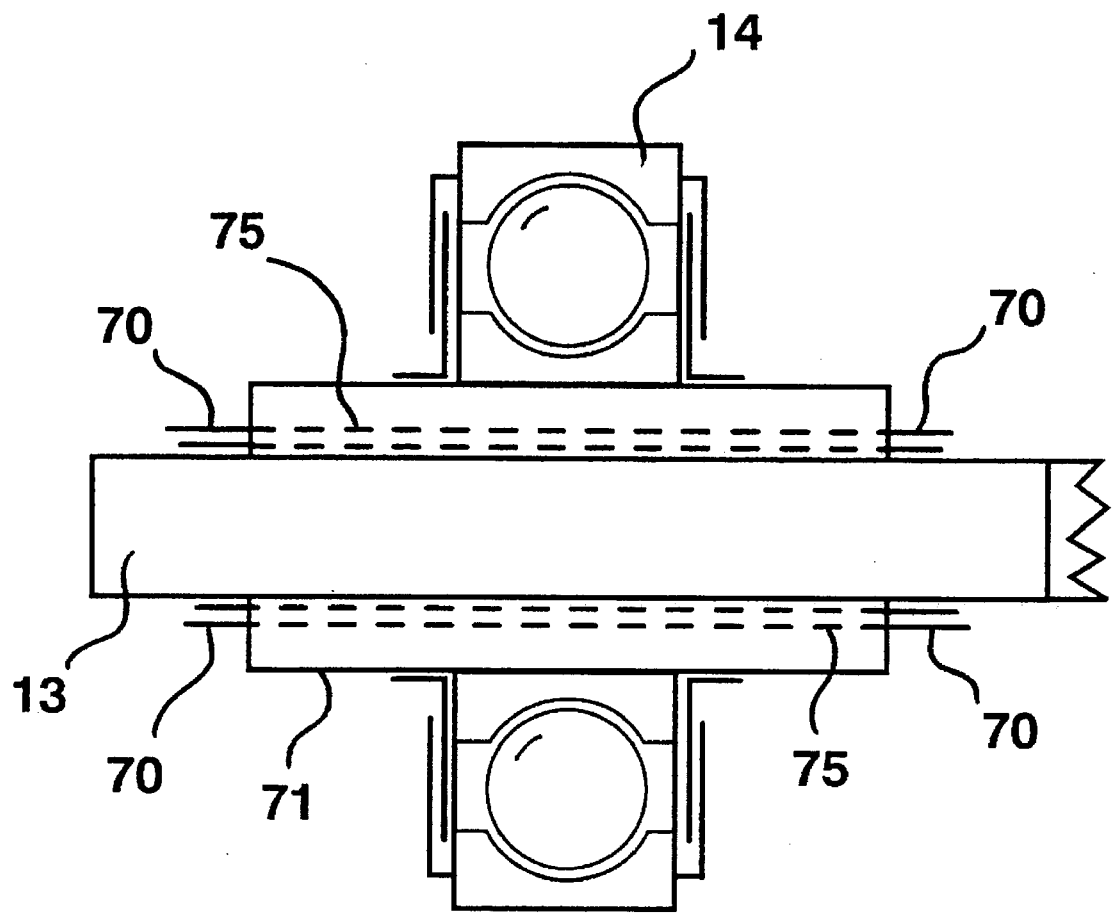
FIG. 10 is a schematic view showing the manner in which the output shaft of the rotary jet engine can be supported to accommodate a fuel delivery system.

A liquid hydrocarbon fuel is, however, a convenient form of fuel and it may be delivered to the jet burners by way of delivery lines 70 (see FIG. 10) which extend along the output shaft 13 of the engine. At locations where the output shaft is rotatably supported on the bearings 14, tunnel sleeves 71 are provided through which the delivery lines 70 can pass. Each tunnel sleeve comprises a sleeve element 73 having one or more axial bores 75 through which the delivery lines can extend.

From the foregoing, it is evident that the various embodiments provide a rotary jet engine which is of relatively simple construction in comparison to many conventional engine designs.

Although the invention has been described in relation to several specific embodiments, it should be appreciated that it is not limited thereto and that various alterations and modifications may be made without departing from the scope of the invention.

I claim:

1. A rotary jet engine comprising a housing having intake and exhaust zones separated from each other, a rotor mounted for rotation within the housing, at least one jet means for generating propulsive fluid from combustion of fuel with said air, said jet means having an intake for receiving air from said intake zone and delivering said air to a combustion chamber to which fuel is delivered for mixing with said air and ignited to initiate combustion and an exhaust outlet for ejection of the propulsive fluid into said exhaust zone, the jet means being mounted on said rotor with its intake spaced from the axis of rotation of said rotor and facing into said intake zone for effecting ram delivery of air from said intake zone into said jet means for combustion and whereby the thrust force thereof causes rotation of said rotor, and means for inhibiting fluid flow from said exhaust zone to said intake zone.

2. A rotary jet engine according to claim 1, wherein the intake and exhaust zones within the housing are separated from each other at least in part by the rotor.

3. A rotary jet engine according to claim 1, wherein said means for inhibiting fluid flow comprises a sealing means provided between the housing and the rotor.

4. A rotary jet engine according to claim 1, wherein said means for inhibiting fluid flow comprises means for generating a positive pressure in the intake zone as compared to the exhaust zone.

5. A rotary jet engine according to claim 1, further including means for generating a positive pressure in the intake zone comprising a delivery means for delivering air into the intake zone.

6. A rotary jet engine according to claim 5, wherein said delivery means comprises a blade assembly operably connected to the rotor.

7. A rotary jet engine according to claim 1, wherein the rotor comprises a rotor disc on which the at least one jet means is mounted.

8. A rotary jet engine according to claim 7, wherein the intake and exhaust zones are disposed on opposed axial sides of the rotor disc.

9. A rotary jet engine according to claim 1, wherein the exhaust zone is disposed radially outwardly of the intake zone with respect to the rotor.

10. A rotary jet engine according to claim 1, further comprising a reaction means against which propulsive fluid discharging from the jet means is directed.

11. A rotary jet engine according to claim 1, wherein the reaction means comprises a plurality of circumferentially spaced reaction surfaces.

12. A rotary jet engine according to claim 11, wherein the housing has an exhaust outlet communicating with the exhaust zone, the reaction means being arranged to direct propulsive fluid in the exhaust zone towards the exhaust outlet.

13. A rotary jet engine according to claim 1, wherein the jet means comprises a jet burner.

14. A rotary jet engine according to claim 1, wherein there is at least one further jet means mounted on a stationary part of the engine and so arranged that propulsion fluid ejected therefrom impinges upon the rotor to thereby cause rotation thereof.

15. A rotary jet engine according to claim 1, wherein there are a plurality of rotors and jet means.

16. A rotary jet engine according to claim 15, wherein the plurality of rotors are mounted for rotation in unison on a common output shaft.

17. A rotary jet engine according to claim 16, wherein the rotors are in spaced apart relationship and the spacing between adjacent rotors defines a respective one of said intake and exhaust zones.

18. A rotary jet engine according to claim 15, wherein at least one of the plurality of rotors is arranged to contra-rotate with respect to at least another of the plurality of rotors.

19. A rotary jet engine according to claim 15, wherein at least one of said rotors is arranged to contra-rotate with respect to the at least one other of said rotors, a respective one or more of the jet means being mounted on one of the rotors and arranged to drive the rotor on which it is mounted by its thrust force and to drive the contra-rotating rotor by impingement of the propulsive fluid thereon.

20. A rotary jet engine according to claim 15, wherein at least one of said rotors is arranged to contra-rotate with respect to the at least one other of said rotors, each rotor having at least one of the jet means mounted thereon, each jet means being arranged to drive the rotor on which it is mounted by its thrust force and to drive the contra-rotating rotor by impingement of the propulsive fluid thereon.

* * * * *